US010495217B2

(12) United States Patent
Teramoto et al.

(10) Patent No.: US 10,495,217 B2
(45) Date of Patent: Dec. 3, 2019

(54) CONTROL COMPONENT PACKAGE UNIT ATTACHING STRUCTURE

(71) Applicant: TOYOTA JIDOSHA KABUSHIKI KAISHA, Toyota-shi, Aichi (JP)

(72) Inventors: Takayuki Teramoto, Nisshin (JP); Shingo Toyama, Nisshin (JP); Yasunori Takeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 15/873,286

(22) Filed: Jan. 17, 2018

(65) Prior Publication Data

US 2018/0216730 A1  Aug. 2, 2018

(30) Foreign Application Priority Data

Jan. 27, 2017   (JP) .................................. 2017-013627

(51) Int. Cl.
| | |
|---|---|
| F16D 3/84 | (2006.01) |
| F16H 61/32 | (2006.01) |
| F16H 59/08 | (2006.01) |
| B60K 6/52 | (2007.10) |
| F16D 27/06 | (2006.01) |
| F16H 61/68 | (2006.01) |

(52) U.S. Cl.
CPC ............... *F16H 61/32* (2013.01); *B60K 6/52* (2013.01); *F16D 27/06* (2013.01); *F16H 59/08* (2013.01); *F16H 61/68* (2013.01)

(58) Field of Classification Search
CPC .. F16H 61/0003; F16H 61/0006; F16H 61/68; F16H 59/08; F16H 61/32; B60R 11/00; B60K 6/52; F16D 27/06; Y02T 10/6265
USPC ................................. 180/344, 350, 374, 377
See application file for complete search history.

(56) References Cited

U.S. PATENT DOCUMENTS

| | | | | |
|---|---|---|---|---|
| 5,083,475 A | * | 1/1992 | Ebsch ..................... | F16H 61/28 74/473.21 |
| 5,361,650 A | * | 11/1994 | Klecker .............. | F16H 61/0006 174/521 |

(Continued)

FOREIGN PATENT DOCUMENTS

| | | |
|---|---|---|
| JP | 2010-71348 A | 4/2010 |
| JP | 2010-223313 A | 10/2010 |

(Continued)

*Primary Examiner* — Toan C To
(74) *Attorney, Agent, or Firm* — Oliff PLC

(57) ABSTRACT

An attachment structure for attaching a control component package unit to a transmission casing which accommodates a power transmitting mechanism of a vehicle and which is disposed in a drive-power-source compartment in a front section of the vehicle such that an axial direction of the power transmitting mechanism is parallel to a transverse direction of the vehicle. The control component package unit includes a container casing accommodating control components for controlling the vehicle. The attachment structure is configured to attach the control component package unit to a rear side part of an outer surface of the transmission casing, such that a straight line normal to the rear side part extends in a direction having a component of a rearward direction of the vehicle.

5 Claims, 7 Drawing Sheets

(56) References Cited

U.S. PATENT DOCUMENTS

| | | | | |
|---|---|---|---|---|
| 5,845,544 A | * | 12/1998 | Huggins | F16H 3/095 |
| | | | | 74/606 R |
| 6,003,395 A | * | 12/1999 | Rogg | F16H 59/70 |
| | | | | 74/335 |
| 6,253,138 B1 | * | 6/2001 | Shober | F16H 59/12 |
| | | | | 477/34 |
| 2005/0006164 A1 | * | 1/2005 | Teraoka | B60K 1/00 |
| | | | | 180/243 |
| 2009/0139362 A1 | | 6/2009 | Ito et al. | |
| 2012/0210814 A1 | * | 8/2012 | Jones, Jr. | F16H 61/36 |
| | | | | 74/473.15 |
| 2013/0289810 A1 | * | 10/2013 | Holmes | B60K 6/24 |
| | | | | 701/22 |
| 2014/0216189 A1 | * | 8/2014 | Anderson | B60K 17/344 |
| | | | | 74/335 |
| 2017/0175863 A1 | * | 6/2017 | Kramer | B60K 1/00 |
| 2019/0084395 A1 | * | 3/2019 | Toyota | B60K 1/00 |

FOREIGN PATENT DOCUMENTS

| | | |
|---|---|---|
| JP | 2015-90203 A | 5/2015 |
| WO | 2009/041678 A1 | 4/2009 |

* cited by examiner

CONTROL COMPONENT PACKAGE UNIT ATTACHING STRUCTURE

This application claims priority from Japanese Patent Application No. 2017-013627 filed on Jan. 27, 2017, the disclosure of which is herein incorporated by reference in its entirety.

FIELD OF THE INVENTION

The present invention relates an improvement of an attaching structure for attaching a control component package unit to an outer surface of a transmission casing of a vehicle.

BACKGROUND OF THE INVENTION

JP-2010-71348A discloses a technique for attaching a control component unit (an electronic circuit device 20 described therein) to an outer surface of a transmission casing of a vehicle. Generally, such a control component unit is attached to an upper surface of the transmission casing such that the control component unit has a substantially horizontally extending posture. JP-2010-223313A and JP-2015-90203A disclose techniques for attaching a noise insulating covering to an outer surface of a transmission casing of a vehicle.

SUMMARY OF THE INVENTION

However, recent demands to reduce the weight and size of a vehicle result in an increased limitation of a space allowed for installation of the transmission casing within an engine room (a drive-power-source compartment) of the vehicle. Accordingly, attachment of a plurality of individual functional components to the outer surface of the transmission casing causes further reduction of a space left within the engine room.

The present invention was made in view of the background art described above. It is therefore an object of the present invention to provide an attachment structure for attaching a control component package unit to a transmission casing of a vehicle, which attachment structure permits reduction of the number of functional components to be attached to the transmission casing, for effectively utilizing the space within the drive-power-source compartment in the vehicle.

The object indicated above is achieved according to the following modes of the present invention:

According to a first mode of the invention, there is provided an attachment structure for attaching a control component package unit to a transmission casing which accommodates a power transmitting mechanism of a vehicle and which is disposed in a drive-power-source compartment in a front section of the vehicle such that an axial direction of the power transmitting mechanism is parallel to a transverse direction of the vehicle. The control component package unit includes a container casing accommodating control components for controlling the vehicle. The attachment structure is configured to attach the control component package unit to a rear side part of an outer surface of the transmission casing, such that a straight line normal to the rear side part extends in a direction having a component of a rearward direction of the vehicle. It is intended that the straight line normal to the rear side part extends in the direction having the component of the rearward direction of the vehicle corresponds to that the rear side part can be seen from rearward of the vehicle in a horizontal direction.

According to a second mode of the invention, the attachment structure according to the first mode of the invention is configured such that the container casing of the control component package unit has a generally flat rear surface remote from the transmission casing, and is attached to the transmission casing such that an angle of a straight line normal to the generally flat rear surface with respect to a longitudinal direction of the vehicle in a vertical plane falls within a range from +45° to −30°, where the angle of upward inclination with respect to the longitudinal direction in the vertical plane is positive.

According to a third mode of the invention, the attachment structure according to the second mode of the invention is configured such that at least a part of the container casing of the control component package unit, which has the generally flat rear surface, is formed of a resin material.

According to a fourth mode of the invention, the attachment structure according to any one of the first through third modes of the invention is configured to attach the control component package unit to the transmission casing such that at least a portion of the control component package unit projects in the rearward direction of the vehicle from a rear end of a profile of the rear side part of the outer surface of the transmission casing, in the longitudinal direction of the vehicle in the vertical plane.

According to a fifth mode of the invention, the attachment structure according to any one of the first through fourth modes of the invention is configured such that the control component package unit is attached to the transmission casing through a bracket device (a fixing device) such that the container casing of the control component package unit is spaced apart from the rear side part of the outer surface of the transmission casing.

According to a sixth mode of the invention, the attachment structure according to any one of the first through fifth modes of the invention is configured such that the transmission casing accommodates a belt-and-pulley type continuously variable transmission as the power transmitting mechanism, and at least a portion of the control component package unit is located within a dimension of the belt-and-pulley type continuously variable transmission in the transverse direction of the vehicle.

In the attachment structure according to the first mode of the invention, the control component package unit is attached to the rear side part of the outer surface of the transmission casing, so that the control component package unit not only functions as a unit accommodating the control components, but also as a noise insulating member for reducing or preventing propagation of noises generated by the transmission casing, toward a passenger compartment of the vehicle located on the rear side of the drive-power-source compartment. Thus, the mere attachment of the control component package unit provides an effect of noise insulation, and therefore permits reduction of the number of components to be attached to the transmission casing, than where a noise insulating covering or any other noise insulating members is attached to the transmission casing. Thus, the attachment structure according to the invention makes it possible to effectively utilize a space within the drive-power-source compartment in the vehicle.

According to the second mode of the invention, the container casing of the control component package unit is attached to the transmission casing such that the angle of the straight line normal to the generally flat rear surface of the container casing with respect to the longitudinal direction of the vehicle in the vertical plane falls within the range from +45° to −30°, so that the noises generated by the transmission casing are effectively insulated by the control component package unit. According to the third mode of the invention, at least a part of the container casing of the control component package unit, which has the generally flat rear surface on the side of a passenger compartment of the vehicle, is formed of the resin material. Accordingly, vibrations of the transmission casing can be effectively damped, and the noises can be insulated with a high degree of efficiency.

According to the fourth mode of the invention, the control component package unit is attached to the transmission casing such that at least a portion of the control component package unit projects in the rearward direction of the vehicle from the rear end of the rear side part of the outer surface of the transmission casing. In this fourth mode of the invention, there is a high possibility that the control component package unit comes into collision with other members such as a dash panel of the vehicle, before its collision with the transmission casing, upon rearward displacement of the transmission casing in the event of head-on collision of the vehicle, for example. Accordingly, it is expected that an impact on the vehicle upon the head-on collision is mitigated by deformation and breakage of the container casing of the control component package unit, and a degree of damaging of the transmission casing is reduced. It is noted that the attachment structure according to the first mode of invention may have a similar advantage that depending upon the positions and shapes of the dash panel or any other members, the control component package unit comes into collision with the other members, before its collision with the transmission casing, in the event of head-on collision of the vehicle, with a result of mitigation of the impact on the vehicle owing to the deformation of the container casing.

According to the fifth mode of the invention, the control component package unit is attached to the transmission casing through a bracket device such that the container casing of the control component package unit is spaced apart from the rear side part of the outer surface of the transmission casing. In this fifth mode of the invention, transmission of the vibrations from the transmission casing to the container casing of the control component package unit is reduced, so that the noise insulating effect is further improved, and the effect of mitigation of the impact on the vehicle in the event of the head-on collision of the vehicle is further improved owing to flexural deformation (buckling) of the bracket device together with deformation of the container casing of the control component package unit.

According to the sixth mode of the invention, the belt-and-pulley type continuously variable transmission is provided as the power transmitting mechanism, and at least a portion of the control component package unit is located within the dimension of the belt-and-pulley type continuously variable transmission in the transverse direction of the vehicle. Accordingly, the noises generated by the belt-and-pulley type continuously variable transmission are effectively insulated by the control component package unit.

DETAILED DESCRIPTION OF PREFERRED EMBODIMENTS

Figure 1:
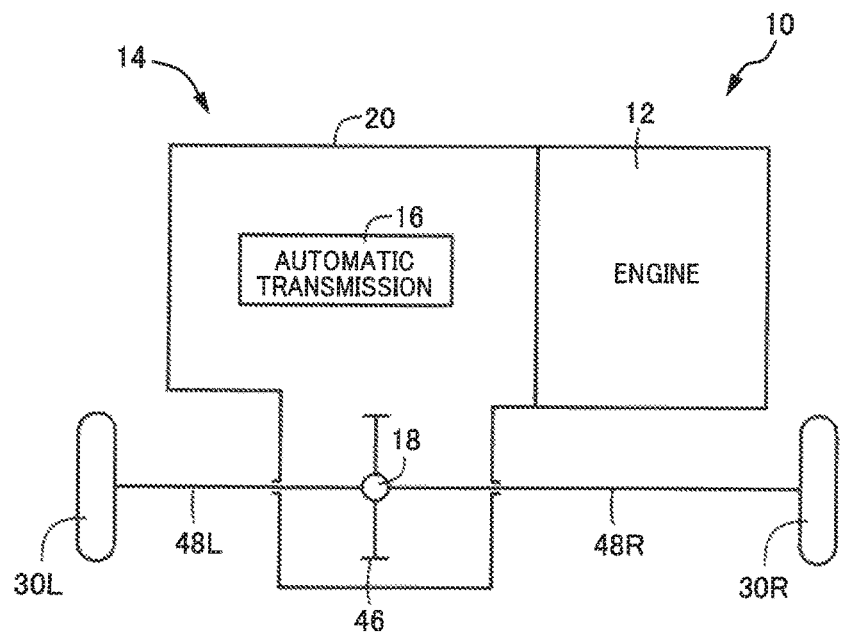
FIG. 1 is a schematic view showing a drive system of a vehicle, which is provided with an attachment structure according to one embodiment of this invention.

The present invention is applicable to a transaxle of a vehicle of an FF (front-engine front-drive) type in which an automatic transmission and a final speed reducing device which serve as a power transmitting mechanism are disposed in a transmission casing of the transaxle. The vehicle having the transaxle may be an engine drive vehicle having an engine (an internal combustion engine) as a drive power source, a hybrid vehicle having an engine and an electric motor as the drive power source, or an electric vehicle having only an electric motor as the drive power source. The electric motor serving as the drive power source may also be disposed within the transmission casing. The automatic transmission may be a step-variable transmission of a planetary gear type, for example, a continuously variable transmission of a belt-and-pulley type, for example, or an electrically controlled continuously variable transmission having an electric differential portion. Alternatively, the automatic transmission may be a forward/reverse switching device for merely switching the power transmitting mechanism between its forward and reverse driving states. The power transmitting mechanism may be provided with a step-variable transmission and a continuously variable transmission which are disposed in series or in parallel with each other.

A control component package unit to be attached to the transmission casing has a container casing accommodating control components, such as a shift control ECU (electronic control unit), a hybrid control ECU, a motor drive PCU (power control unit), various circuit boards, a neutral switch for detecting a neutral state of the power transmitting mechanism, a shift position sensor for detecting a selected position of a shift lever, and other control components provided as needed for controlling the power transmitting mechanism. The present invention is also applicable to a transaxle having a transmission casing to which is attached a control component package unit accommodating control components other than those of the power transmitting mechanism such as an engine control ECU. Preferably, an entirety of the container casing including its bottom portion on the side adjacent to the transmission casing is formed of a synthetic resin. However, only a rear wall portion of the container casing on the side remote from the transmission casing, namely, only a cover portion of the container casing on the side of a passenger compartment of the vehicle may be formed of a synthetic resin. In this case, the bottom portion and side wall portions of the container casing are formed of a metallic material, for instance. The synthetic resin may be replaced by a metallic or other material having a high degree of vibration damping property.

To save a space required for installation of the control component package unit, the container casing of the control component package unit is desirably a generally plate-like rectangular parallelepiped body, a prismatic body, or a cylindrical body, and is preferably attached to a rear side part of an outer surface (hereinafter referred to as "rear side outer surface") of the transmission casing such that a plane of the container casing is almost parallel to the rear side outer surface of the transmission casing. However, the container casing may be attached to the rear side our surface of the transmission casing such that the plane of the container casing is purposely inclined with respect to the rear side outer surface. The container casing may be a cubic body, a prismatic body, a cylindrical body, which has a comparatively large dimension in a direction perpendicular to the rear side outer surface of the transmission casing. The container casing may take any other forms. Where the rear side outer surface of the transmission casing is curved, for example, the container casing may also be curved along the curved rear side outer surface of the transmission casing. The principle of the present invention at least requires that a straight line normal to the rear side outer surface of the transmission casing extends in a direction having a component of a rearward direction of the vehicle. The straight line normal to the rear side outer surface of the transmission casing may be inclined with respect to the longitudinal or running direction of the vehicle in the vertical plane, and/or in the horizontal plane. Further, the rear side outer surface may be curved. However, it is preferred that angles of the straight line normal to the rear side outer surface of the transmission casing with respect to the longitudinal direction of the vehicle in the vertical and horizontal planes fall within a range of ±60°, more preferably, within a range of ±45°, where the angles are 0° when the straight line normal to the rear side outer surface is parallel to the longitudinal direction of the vehicle in the vertical and horizontal planes.

Preferably, the container casing of the control component package unit has a generally flat rear surface which faces the rearward direction of the vehicle and which is formed such that an angle of a straight line normal to the generally flat rear surface with respect to the longitudinal direction of the vehicle in the vertical plane falls within a range from +45° to −30°, more preferably, within a range from about +30° to about −15°, where the angle of upward inclination with respect to the longitudinal direction in the vertical plane is positive. Even where the rear surface of the container casing is curved in the vertical plane, an angle of a straight line perpendicular to a straight line tangent to a curve of the curved rear surface, with respect to the longitudinal direction in the vertical plane, preferably falls within a range from +45° to −30° at each point on the curved rear surface. Further, an angle of the straight line normal to the rear surface with respect to the longitudinal direction of the vehicle in the horizontal plane preferably falls within a range of about ±30°, more preferably, within a range of about ±10°. While the rear surface of the container casing is preferably a generally flat surface, but may take any other shape such as a curved or spherical shape. The generally flat rear surface need not be perfectly flat, but may be locally concave or convex.

The control component package unit is preferably attached to the transmission casing such that at least a portion of the control component package unit projects in the rearward direction of the vehicle from the rear end position of the rear side outer surface of the transmission casing. More preferably, the control component package unit is attached to the transmission casing via a bracket or similar device such that an entirety of the control component package unit projects in the rearward direction of the vehicle from the rear end position of the rear side outer surface of the transmission casing. Where the rear side outer surface of the transmission casing is curved in the vertical plane parallel to the vehicle longitudinal direction, for example, the entirety of the control component package unit may be located forwardly of the rear end position of the rear side outer surface of the transmission casing. In this case, too, the control component package unit may come into collision with a dash panel or any other members, before its collision with the transmission casing, in the event of head-on collision of the vehicle, for example, depending upon the positions and shapes of the other members, so that an impact on the vehicle upon the head-on collision is mitigated. On the other hand, there is a possibility that the control component package unit does not collide with the dash panel or any other members, before its collision with the transmission casing, in the event of head-on collision of the vehicle, even where at least a portion of the control component package unit projects in the rearward direction of the vehicle from the rear end position of the rear side outer surface of the transmission casing. Namely, it is not essential according to the present invention to configure the attachment structure so that the control component package unit comes into collision with the other members, before its collision with the transmission casing, in the event of head-on collision of the vehicle.

While the control component package unit may be attached to the transmission casing through a bracket device, for example, the container casing of the control component package unit my be fixed directly to the transmission casing. The control component package unit may be attached to the transmission casing such that a bottom surface (i.e. a surface opposite to a front surface) of the container casing is held in contact with the rear side outer surface of the transmission casing. However, the rear side outer surface of the transmission casing may be formed with a rearwardly projecting boss to which the container casing of the control component package unit is bolted or otherwise fixed, such that the control component package unit is spaced from the rear side outer surface of the transmission casing in the rearward direction of the vehicle. The container casing may be fixed with an adhesive agent to the rear side outer surface of the transmission casing through a spongy member or any other cushioning member. The above-indicated bracket device is desirably a metallic member, but may be formed of a synthetic resin material or any other material having a sufficient degree of structural strength.

Where the belt-and-pulley type continuously variable transmission is provided as the power transmitting mechanism, this continuously variable transmission generates a comparatively large amount of noises. In this case, therefore, it is desirable to dispose the control component package unit such that at least a portion of the control component package unit is located within the dimension of the belt-and-pulley type continuously variable transmission in the transverse or width direction of the vehicle. However, the control component package unit may be located outside the dimension of the continuously variable transmission in the transverse direction of the vehicle, in view of generation of noises by meshing gears of any other power transmitting device disposed adjacent to the continuously variable transmission in the transverse direction of the vehicle. Namely, the position of the control component package unit in the transverse direction of the vehicle may be adequately determined depending upon the specifications of the power transmitting mechanism, that is, the position of sources of generation of noises, a magnitude of the generated noises, and a frequency of the noises, for example.

Embodiment

A preferred embodiment of this invention will be described in detail by reference to the drawings. It is to be understood that the drawings are simplified and transformed as needed, and do not necessarily accurate represent the dimensions and shapes of various elements of the embodiment.

Figure 2:
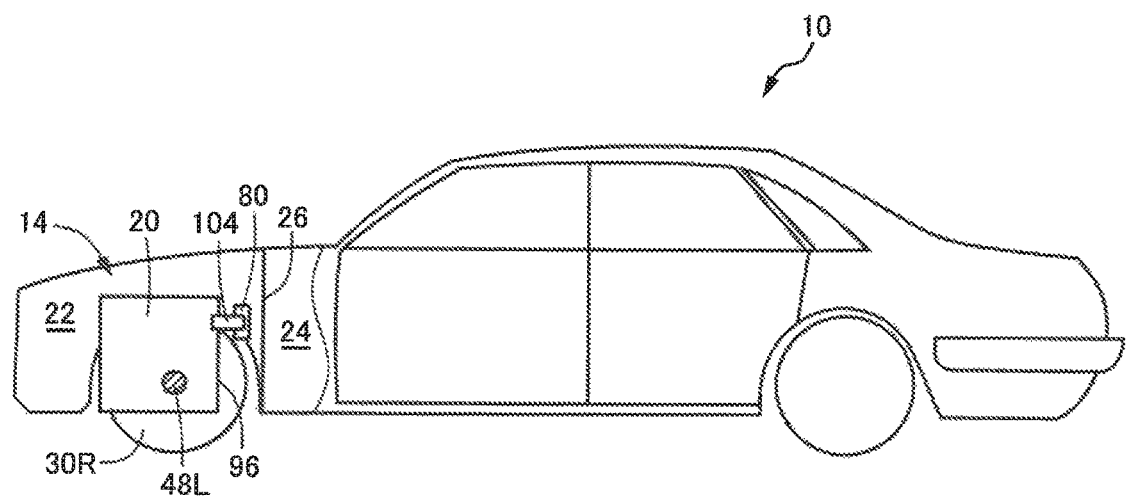
FIG. 2 is a schematic partly cut-away side elevational view illustrating the vehicle of FIG. 1 in which a transaxle and an engine are disposed within an engine room.

Reference is first made to FIG. 1, which is the schematic view showing a drive system of a vehicle 10, which is provided with an attachment structure according to one embodiment of this invention. The vehicle 10 is an engine drive vehicle of an FF type having an engine 12 as an internal combustion engine and a transaxle 14. The transaxle 14 is provided with an automatic transmission 16 and a final speed reduction device 18 as a power transmitting mechanism. These automatic transmission 16 and the final speed reduction device 18 are accommodated in a transmission casing 20. As shown in FIG. 2, the transaxle 14 is transversely disposed together with the engine 12, within an engine room 22 provided in a front section of the vehicle 10, namely, such that axial directions of the automatic transmission 16 and the final speed reduction device 18 are parallel to a transverse direction of the vehicle 10. The engine room 22 is a drive-power-source compartment in which the drive power source in the form of the engine 12 is disposed. The engine room 22 is partitioned from a passenger compartment 24 by a partition member 26 in the form of a dash panel, for example. FIG. 2 is the schematic partly cut-away side elevational view illustrating the vehicle 10.

Figure 3:
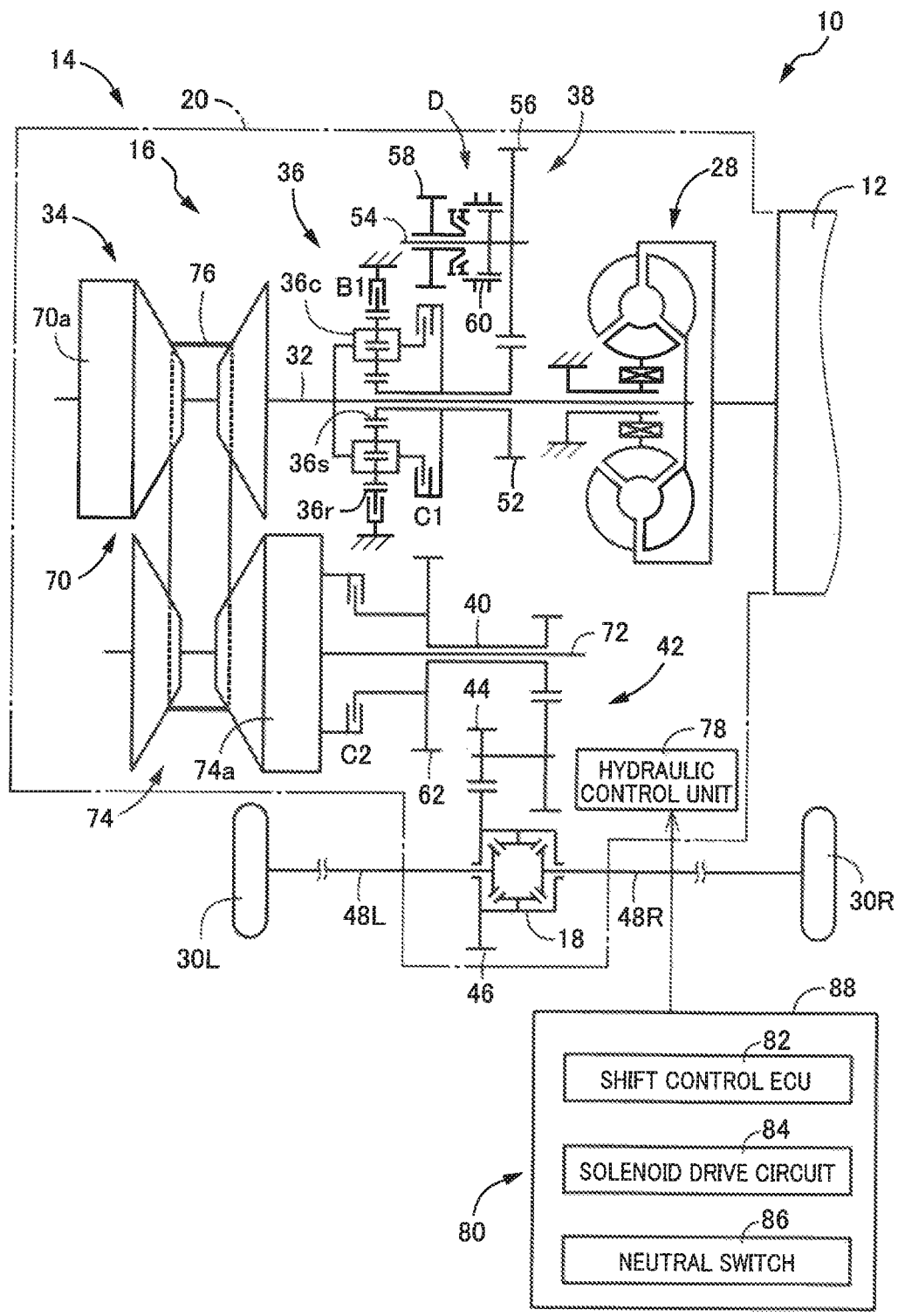
FIG. 3 is a schematic illustration showing an example of a power transmitting mechanism of the transaxle of FIG. 1, together with major portions of a control system.

FIG. 3 is the schematic illustration which shows an example of the power transmitting mechanism of the transaxle 14 and in which mutually parallel axes of the transaxle 14 are shown in the plane of FIG. 3. An output of the engine 12 is transmitted to the final speed reduction device 18 through a fluid-operated power transmitting device in the form of a torque converter 28, and the automatic transmission 16, and is transmitted to distributed to left and right drive wheels (front wheels) 30L and 30R through left and right axles 48L and 48R. The automatic transmission 16 includes: an input shaft 32 formed integrally with an output rotary member or a turbine shaft of the torque converter 28; a belt-and-pulley type continuously variable transmission 34 connected to the input shaft 32; a forward/reverse switching device 36 and a gear type transmission mechanism 38 which are connected to the input shaft 32 and which are disposed in parallel with the belt-and-pulley type continuously variable transmission 34; an output shaft 40 which is a common output member of the belt-and-pulley type continuously variable transmission 34 and the gear type transmission mechanism 38; and a speed reduction gear device 42. The speed reduction gear device 42 has a small-diameter gear 44 meshing with a ring gear 46 of the final speed reduction device 18. In the thus constructed automatic transmission 16, the output of the engine 12 is transmitted from the torque converter 28 to the output shaft 40 through the belt-and-pulley type continuously variable transmission 34, or to the output shaft 40 through the forward/reverse switching device 36 and the gear type transmission mechanism 38, without transmission through the belt-and-pulley type continuously variable transmission 34. The output of the engine 12 is then transmitted from the output shaft 40 to the drive wheels 30L and 30R through the left and right axles 48L and 48R through the speed reduction gear device 42 and the final speed reduction device 18.

That is, the automatic transmission 16 has a first power transmitting path through which the output of the engine 12 is transmitted to the output shaft 40 through the input shaft 32 and the belt-and-pulley type continuously variable transmission 34, and a second power transmitting path through which the output of the engine 12 is transmitted to the output shaft 40 through the input shaft 32, the forward/reverse switching device 36 and the gear type transmission mechanism 38. The automatic transmission 16 is switched between two power transmitting states corresponding to the respective first and second power transmitting paths, according to the running state of the vehicle 10. For the automatic transmission 16 to be switchable between these two power transmitting states, the automatic transmission 16 is provided with a clutch C2 for selectively permitting and preventing power transmission through the first power transmitting path, and a meshing-gear type clutch D for selectively permitting and preventing power transmission through the second power transmitting path. When the clutch C2 is placed in its engaged state, the output of the engine 12 is transmitted through the belt-and-pulley type continuously variable transmission 34. When the meshing-gear type clutch D is placed in its engaged state, the output of the engine 12 is transmitted through the gear type transmission mechanism 38.

The forward/reverse switching device 36 is principally constituted by a planetary gear set of a double-pinion type which includes: a carrier 36c integrally connected to the input shaft 32; a sun gear 36s connected to a small-diameter gear 52 which is disposed coaxially with and rotatably relative to the input shaft 32; and a ring gear 36r selectively connected to a stationary member through a reverse drive brake B1, and wherein the carrier 36c and the sun gear 36s are selectively connected to each other through a forward drive clutch C1. When the forward drive clutch C1 is placed in an engaged state while the reverse drive brake B1 is placed in a released state, the input shaft 32 is directly connected to the small-diameter gear 52, so that the vehicle 10 is placed in a forward driving state. When the reverse drive brake B1 is placed in an engaged state while the forward drive clutch C1 is placed in a released state, on the other hand, the small-diameter gear 52 is rotated in a direction opposite to a direction of rotation of the input shaft 32, so that the vehicle 10 is placed in a reverse driving state. When both of the forward drive clutch C1 and the reverse drive brake B1 are placed in the released state, the vehicle 10 is placed in a neutral state in which the power transmission through the second power transmitting path is inhibited.

The gear type transmission mechanism 38 includes: the small-diameter gear 52; a large-diameter gear 56 rotatable together with a counter shaft 54 and meshing with the small-diameter gear 52; and a small-diameter idler gear 58 disposed coaxially with and rotatably relative to the counter shaft 54. The meshing-gear type clutch D indicated above is disposed between the counter shaft 54 and the idler gear 58, so that the counter shaft 54 and the idler gear 58 are selectively connected to and disconnected from each other. The meshing-gear type clutch D is provided with a synchronous-meshing mechanism (synchronizing mechanism) such as a synchronizer ring, and a clutch hub sleeve 60. When the clutch hub sleeve 60 is axially moved in a leftward direction as seen in FIG. 3, that is, in a coupling direction, the idler gear 58 is rotated in synchronization with the counter shaft 54 through the synchronizer ring. When the clutch hub sleeve 60 is further moved in the coupling direction, the idler gear 58 is connected to the counter shaft 54 through spline teeth formed in an inner circumferential surface of the clutch hub sleeve 60, so that the idler gear 58 is rotated together with the counter shaft 54. The clutch hub sleeve 60 is axially moved in opposite directions by a switching device such as a hydraulic servo device not shown, so that the idler gear 58 and the counter shaft 54 are connected to and disconnected from each other. The idler gear 58 is held in meshing engagement with a large-diameter gear 62 formed with the output shaft 40. When one of the forward drive clutch C1 and the reverse drive brake B1 is placed in its engaged state while the meshing-gear type clutch D is placed in the engaged state, the output of the engine 12 is transmitted from the input shaft 32 to the output shaft 40 through the forward/reverse switching device 36, gear type transmission mechanism 38, idler gear 58 and large-diameter gear 62 in this order of description, namely, through the second power transmitting path.

The belt-and-pulley type continuously variable transmission 34 includes: a primary pulley 70 which is mounted on the input shaft 32 and an effective diameter of which is variable; a secondary pulley 74 which is mounted on a rotary shaft 72 coaxial with the output shaft 40 and an effective diameter of which is variable; and a transmission belt 76 connecting the primary and secondary variable-diameter pulleys 70 and 74 to each other, to transmit a rotary motion between these pulleys 70 and 74 through frictional contacts of the transmission belt 76 with the variable-diameter pulleys 70 and 74. Effective widths of V-grooves of the variable-diameter pulleys 70 and 74 are changed in opposite directions synchronizingly by hydraulic actuators 70a and 74a, and the effective diameters of the pulleys 70 and 74 in frictional contact with the transmission belt 76 are accordingly changed, so that a speed ratio of the continuously variable transmission 34 is continuously varied. The output shaft 40 is disposed coaxially with and rotatably relative to the rotary shaft 72, and the above-described clutch C2 is disposed between the output shaft 40 and the secondary pulley 74. The clutch C2 selectively permits and prevents the power transmission between the output shaft 40 and the secondary pulley 74. When the clutch C2 is placed in the engaged state, the output of the engine 12 is transmitted from the input shaft 32 to the output shaft 40 through the belt-and-pulley type continuously variable transmission 34, namely, through the first power transmitting path.

The transaxle 14 constructed as described above is provided with a hydraulic control unit 78 incorporating electromagnetic hydraulic control valves, electromagnetic hydraulic passage switching valves, and a manual valve, which are provided to control hydraulic pressures of the hydraulic actuators 70a and 74a to control a tension of the transmission belt 76 and the speed ratio of the belt-and-pulley type continuously variable transmission 34, to selectively place the clutch C1 and brake B1 in the engaged and released states to selectively place the forward/reverse switching device 36 in the forward or reverse driving state, and to selectively place the clutch C2 and the meshing-gear type clutch D in the engaged and released states for selectively permitting and preventing power transmission through the first and second power transmitting paths. The transaxle 14 is also provided with a control component package unit 80 for implementing the above-described various controls through the hydraulic control unit 78. The control component package unit 80 accommodates various control components such as a shift control ECU 82 having a microcomputer, a solenoid drive circuit 84 for controlling electromagnetic valves, and a neutral switch 86 for detecting the neutral state of the forward/reverse switching device 36. These control components are accommodated in a resin casing 88 of the control component package unit 80. The shift control ECU 82 provided for controlling the continuously variable transmission 34 receives various signals for controlling the vehicle 12, such as a running speed V of the vehicle 10, an operating speed Ne of the engine 12, a turbine speed Nt of the torque converter 28 (a rotating speed of the input shaft 32), an output speed Nout of the automatic transmission 16 (rotating speed of the output shaft 40), an operation amount Acc of an accelerator pedal, and an angle θth of opening of an electronic throttle valve of the engine 12.

Figure 4:
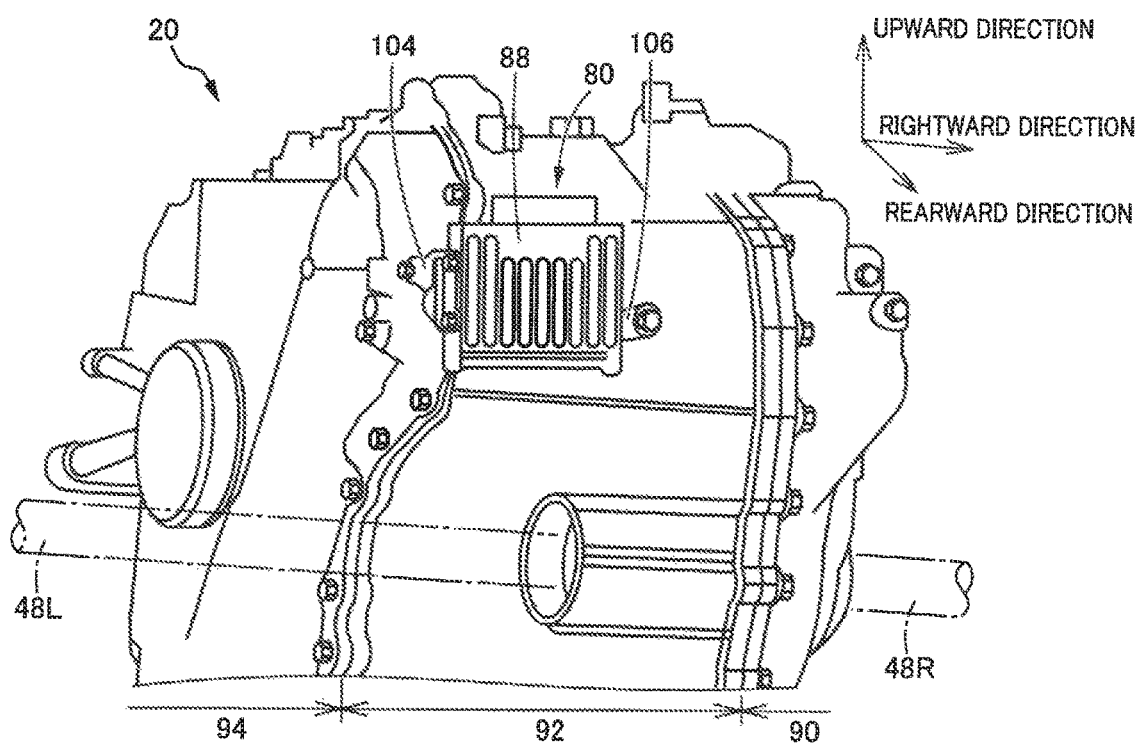
FIG. 4 is a schematic perspective view showing an appearance of a transmission casing of the transaxle of FIG. 1.
Figure 5:
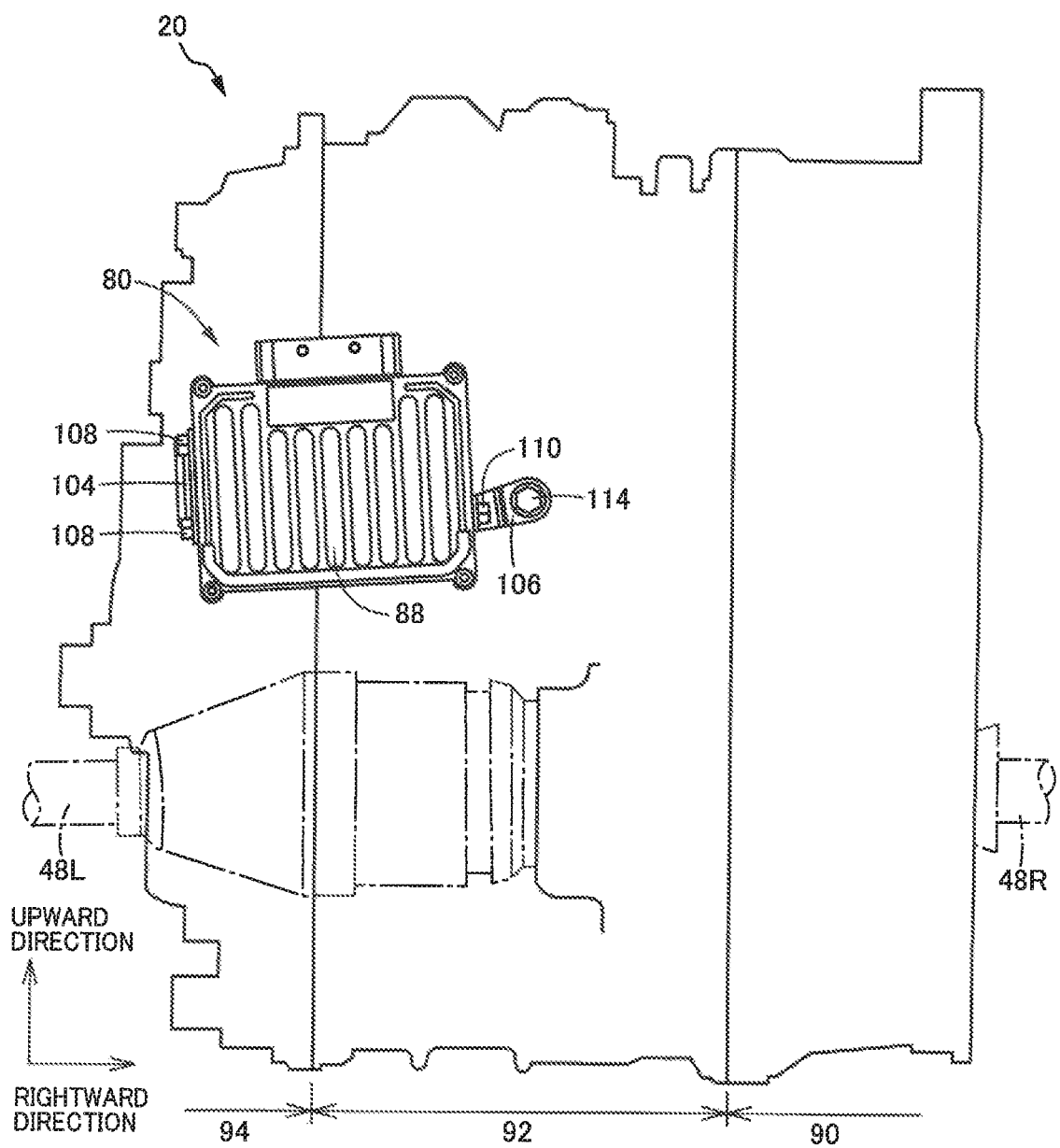
FIG. 5 is an elevational view, viewed from a rear side of the vehicle, showing the transmission casing of FIG. 4 and a front surface of a control component package unit attached to the transmission casing, as seen in a forward direction of the vehicle.
Figure 6:
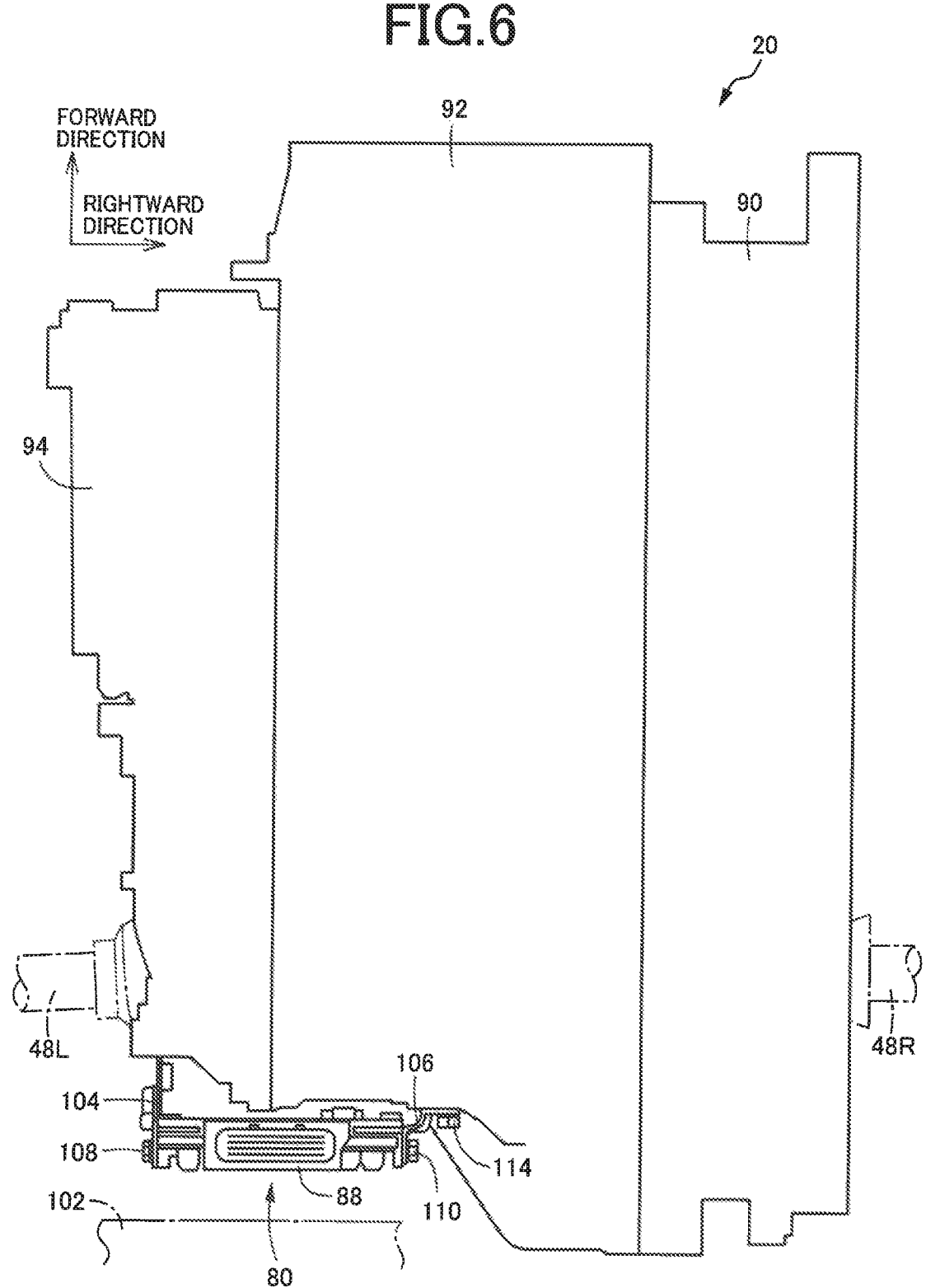
FIG. 6 is a top plan view showing the transmission casing of FIG. 4 and the control component package unit of FIG. 5 attached to the transmission casing, as seen in a downward direction of the vehicle.
Figure 7:
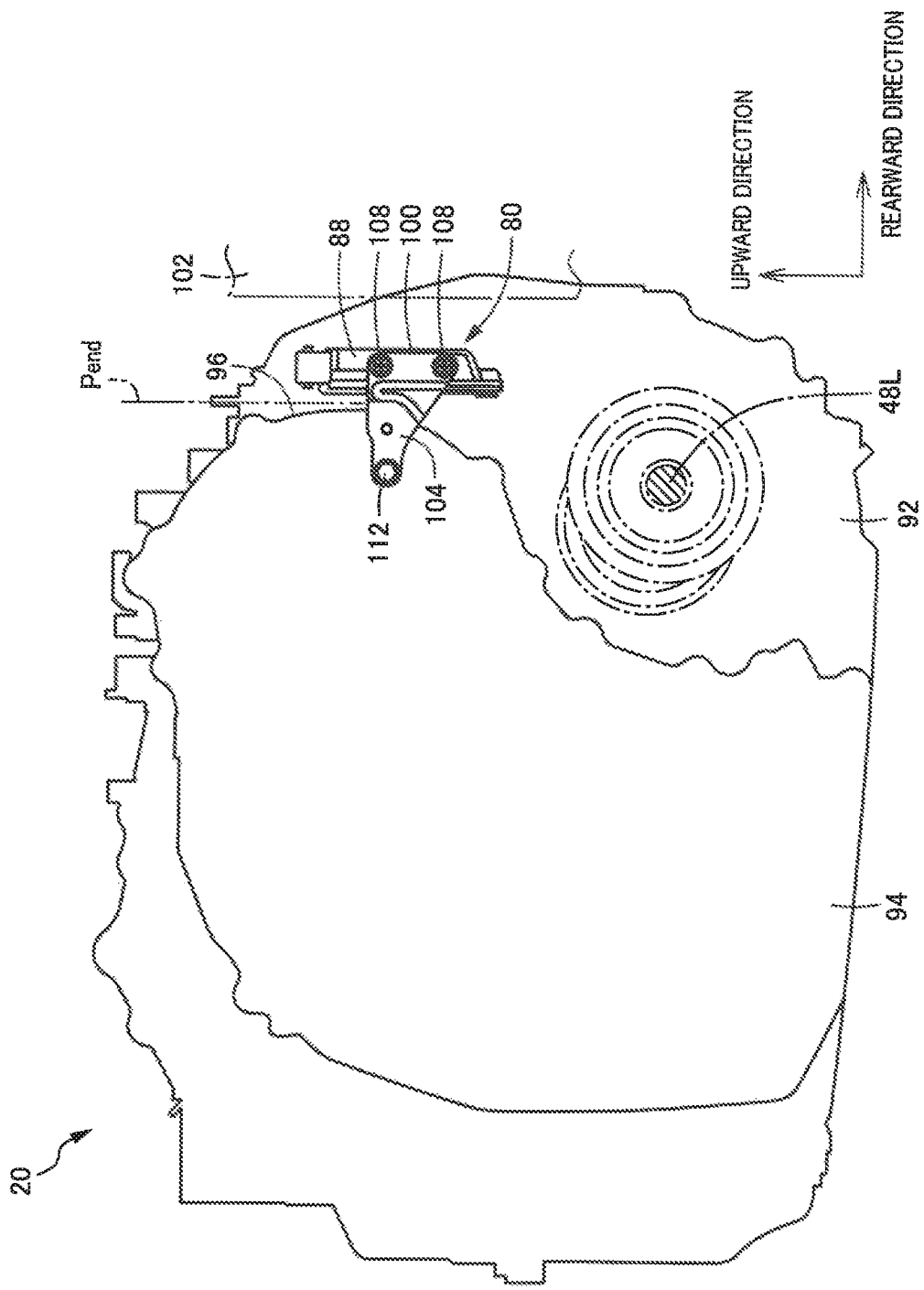
FIG. 7 is a side elevational view showing the transmission casing of FIG. 4 and the control component package unit of FIG. 5 attached to the transmission casing, as seen in a rightward direction of the vehicle.

The above-indicated resin casing 88 is a container casing in the form of a generally plate-like hollow rectangular parallelepiped body an entirety of which is formed of a synthetic resin such as PBT (polybutylene terephthalate). That is, a bottom wall, side walls, front and rear walls and cover portion of the resin casing 88 are formed of a synthetic resin. The control component package unit 80 accommodating the control components in its resin casing 88 is attached to an outer surface of the transmission casing 20. FIG. 4 is the schematic perspective view showing an appearance of the transmission casing 20 as seen relatively upwardly from a rear left-side position of the vehicle 10. FIG. 5 is the elevational view, viewed from a rear side of the vehicle 10, showing the appearance of the transmission casing 20 and a front surface of the control component package unit 80 attached to the transmission casing 20, as seen in the forward direction of the vehicle 10. FIG. 6 is the top plan view showing the transmission casing 20 and the control component package unit 80 attached to the transmission casing 20, as seen in the downward direction of the vehicle 10. FIG. 7 is a side elevational view showing the transmission casing 20 and the control component package unit 80 attached to the transmission casing 20, as seen in the rightward direction of the vehicle 10.

As shown in FIGS. 4-7, the transmission casing 20 has a housing 90 integrally fixed to the engine 12 with a plurality of bolts, a main body 92 integrally fixed to the housing 90 with a plurality of bolts, and an end covering 94 integrally fixed to the main body 92 with a plurality of bolts. The control component package unit 80 is located adjacent to an interface between the main body 92 and the end covering 94, namely, such that at least a portion of the control component package unit 80 is located within a dimension of the belt-and-pulley type continuously variable transmission 34 in the transverse direction of the vehicle 10. The control component package unit 80 is disposed so as to be opposed to a rear side part 96 of the outer surface of the transmission casing 20 (hereinafter referred to as "rear side outer surface 96") as shown in FIG. 7, which rear side outer surface 96 is located on the rear side of the transmission casing 20 and adjacent to the interface between the main body 92 and the end covering 94. While the rear side outer surface 96 is generally arcuate as shown in FIG. 7, a straight line normal to the rear side outer surface 96 extends in a direction having a component of the rearward direction of the vehicle 10. In the present embodiment, the angles of the straight line normal to the rear side outer surface 96 with respect to the longitudinal direction of the vehicle 10 in the vertical and horizontal planes fall within a range of ±45°, where the angles are 0° when the straight line normal to the rear side outer surface 96 is parallel to the longitudinal direction of the vehicle in the vertical and horizontal planes. The control component package unit 80 is attached to the transmission casing 20 such that at least a portion of the control component package unit 80 is located within the rear side outer surface 96 in the transverse direction of the vehicle 10 as seen from rear side of the vehicle 10.

The resin casing 88 which is the generally plate-like rectangular parallelepiped body is disposed substantially in parallel to the rear side outer surface 96. In the present embodiment, the resin casing 88 is disposed substantially in parallel to the transverse direction of the vehicle 10, and so as to extend substantially upright, as shown in the side elevational view of FIG. 7. The resin casing 88 is disposed such that its bottom surface as seen in the longitudinal direction of the vehicle 10 is opposed to the transmission casing 20 (rear side outer surface 96), and such that its rear surface 100 which is remote from the transmission casing 20, namely, which is on the rear side of the vehicle 10, extends substantially upright. Namely, in order for the resin casing 88 to reduce propagation of noises generated due to vibrations of the transmission casing 20 to the passenger compartment 24, it is preferable to dispose the resin casing 88 such that an angle of a straight line normal to the rear surface 100 with respect to the longitudinal direction of the vehicle in the vertical plane falls within a range from +45° to −30°, more preferably, within a range from about +30° to about −15°, where the angle of upward inclination with respect to the longitudinal direction in the vertical plane is positive. In the present embodiment, this angle is substantially 0°. The location and posture of the control component package unit 80 are suitably determined while taking account of various factors such as: actually detected vibrations of the transmission casing 20 and an actually investigated sound pressure distribution of noises generated by the transmission casing 20 during operation of the transaxle 14; locations of sources of the noises of different frequency bands; sound insulating properties of the control component package unit 80 contributing to prevent the propagation of the noises to the passenger compartment 24; and impact damping properties of the control component package unit 80 in the event of head-on collision of the vehicle 10.

The control component package unit 80 is preferably attached to the transmission casing 20 such that at least a portion of the control component package unit 80 projects in the rearward direction of the vehicle 10 from a rear end position Pend of the rear side outer surface 96 of the transmission casing 20, so that the control component package unit 80 comes into collision with the other member 102 such as the partition member 26, before its collision with the transmission casing 20, upon rearward displacement of the transmission casing 20 in the event of head-on collision of the vehicle 10, whereby an impact on the vehicle 10 upon the head-on collision is mitigated by deformation and breakage of the resin casing 88 of the control component package unit 80. In the present embodiment, the control component package unit 80 is attached to the transmission casing 20 such that an entirety of the control component package unit 80 projects in the rearward direction of the vehicle 10 from the rear end position Pend of the rear side outer surface 96 of the transmission casing 20. Described more specifically, the control component package unit 80 is attached to the transmission casing 20 through a pair of brackets 104 and 106 such that the resin casing 88 of the control component package unit 80 is spaced apart from the rear side outer surface 96. The read end position Pend is an extreme rear end of a profile of the rear side outer surface 96 as seen in the longitudinal direction of the vehicle 10 in the vertical plane.

Each of the brackets 104 and 106 is formed of a metallic material, for example, formed from an iron plate, and is fixed to a corresponding one of right and left side surfaces of the resin casing 88 with bolts 108, 110. The left-side bracket 104 is a triangular plate which is provided with integrally formed reinforcement beads (concavities and convexities which are arcuate in cross section), and which is fixed to a left side surface of the resin casing 88 with the pair of bolts 108, at respective two vertically spaced-apart positions, and to an end face of the end covering 94 with a screw 112, at its forwardly extending front end portion. The screw 112 is screwed into the end covering 94 in the transverse direction of the vehicle 10. The right-side bracket 106 is an L-shaped plate which is provided with integrally formed reinforcement beads, and which is fixed to a right side surface of the resin casing 88 with the bolt 110, at its one end portion, and to the outer surface of the main body 92 of the transmission casing 20 with a screw 114, at the other end portion. The screw 114 is screwed into the main body 92 in the forward direction of the vehicle 10. These brackets 104 and 106 permit the control component package unit 80 to be attached to the transmission casing 20 in a predetermined posture with a high degree of stability, with a reduced number of bolts and screws.

In the attachment structure for attaching the control component package unit 80 to the transmission casing 20 according to the present embodiment, the control component package unit 80 is attached to the rear side outer surface 96 of the transmission casing 20, so that the control component package unit 80 not only functions as a unit accommodating the control components, but also as a noise insulating member for reducing or preventing propagation of noises generated by the transmission casing 20, toward the passenger compartment 24 located on the rear side of the engine room 22. Thus, the mere attachment of the control component package unit 80 provides an effect of noise insulation, and therefore permits reduction of the number of components to be attached to the transmission casing 20, than where a noise insulating covering or any other noise insulating members is attached to the transmission casing 20. Thus, the attachment structure according to the illustrated embodiment makes it possible to effectively utilize a space within the engine room 22.

Further, the resin casing 88 of the control component package unit 80 is attached to the transmission casing 20 such that the angles of the straight line normal to the rear surface 100 of the resin casing 88 with respect to the longitudinal direction of the vehicle 10 in the vertical and horizontal planes are substantially 0°. Namely, the resin casing 88 in the form of a generally plate-like rectangular parallelepiped body is attached to the transmission casing 20 such that the resin casing 88 is substantially parallel to the transverse direction of the vehicle 10, and extends substantially upright, so that the noises generated by the transmission casing 20 are effectively insulated by the control component package unit 80. Furthermore, the entirety of the resin casing 88 which has the rear surface 100 on the side of the passenger compartment 24 is formed of the resin material. Accordingly, vibrations can be effectively damped, and the noises can be insulated with a high degree of efficiency.

In addition, the control component package unit 80 is attached to the transmission casing 20 such that the entirety of the control component package unit 80 projects in the rearward direction of the vehicle 10 from the rear end position Pend of the rear side outer surface 96 of the transmission casing 20. Accordingly, there is a high possibility that the control component package unit 80 comes into collision with the other member 102 such as the partition member 26, before its collision with the transmission casing 20, upon rearward displacement of the transmission casing 20 in the event of head-on collision of the vehicle 10, for example. Accordingly, it is expected that an impact on the vehicle 10 upon the head-on collision is mitigated by deformation and breakage of the resin casing 88 of the control component package unit 80, and a degree of damaging of the transmission casing 20 is reduced.

Furthermore, the control component package unit 80 is attached to the transmission casing 20 through the pair of brackets 104 and 106 such that the resin casing 88 of the control component package unit 80 is spaced apart from the rear side outer surface 96. Accordingly, transmission of vibrations from the transmission casing 20 to the resin casing 88 of the control component package unit 80 is reduced, so that the noise insulating effect is further improved, and the effect of mitigation of the impact on the vehicle 10 in the event of the head-on collision of the vehicle 10 is further improved owing to flexural deformation (buckling) of the brackets 104 and 106 together with deformation of the resin casing 88 of the control component package unit 80.

In the transaxle 14 in the illustrated embodiment, a comparatively large amount of noises is generated by and around the belt-and-pulley type continuously variable transmission 34. However, the control component package unit 80 is located within the dimension of the belt-and-pulley type continuously variable transmission 34 in the transverse direction of the vehicle 10. Accordingly, the noises generated by the belt-and-pulley type continuously variable transmission 34 are effectively insulated by the control component package unit 80.

Figure 8:
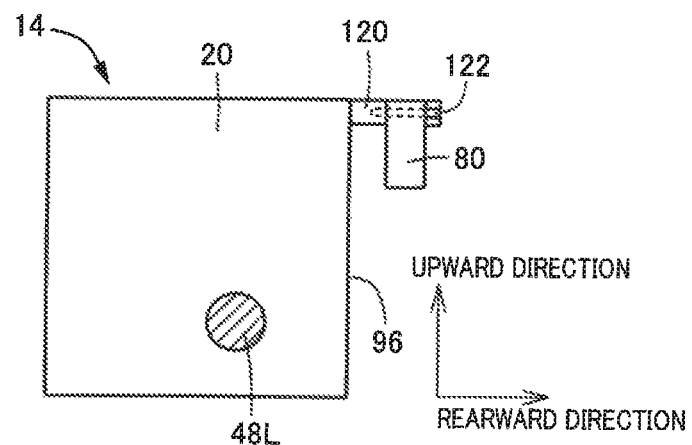
FIG. 8 is a left-side elevational view corresponding to that of FIG. 2, showing the transaxle and the control component package unit in another embodiment of the invention.
Figure 9:
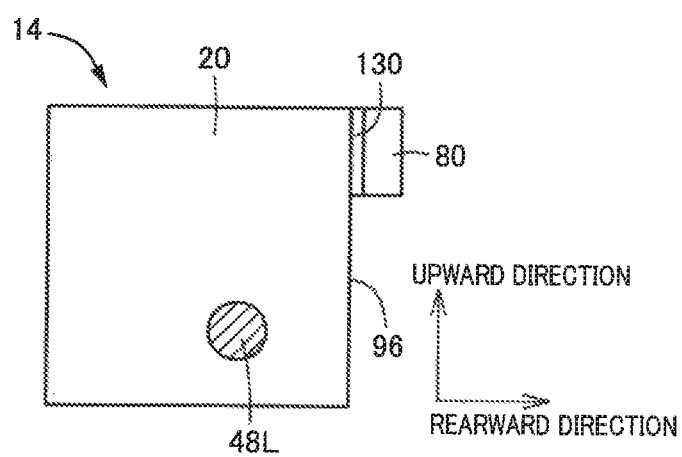
FIG. 9 is a left-side elevational view corresponding to that of FIG. 2, showing the transaxle and the control component package unit in a further embodiment of the invention.

While the control component package unit 80 is attached to the transmission casing 20 through the pair of brackets 104 and 106 in the illustrated embodiment, the resin casing 88 of the control component package unit 80 may be fixed with a bolt 122 to an attachment seat 120 which is fixed to the rear side outer surface 96 of the transmission casing 20 and protruding rearward of the vehicle 10, as shown in FIG. 8, for example. Alternatively, the resin casing 88 may be bonded with an adhesive to a rear surface of a spongy member such as a cushion member 130 a front surface of which is bonded with an adhesive to the rear side outer surface 96, as shown in FIG. 9.

While the preferred embodiment of the invention and its modifications have been described by reference to the drawings, for illustrative purpose only, it is to be understood that the present invention may be embodied with various other changes and improvements which may occur to those skilled in the art.

Nomenclature of Elements

10: Vehicle
16: Automatic transmission (Power transmitting mechanism)
18: Final speed reduction device (Power transmitting mechanism)
20: Transmission casing
22: Engine room (Drive-power-source compartment)
34: Belt-and-pulley type continuously variable transmission (Power transmitting mechanism)
80: Control component package unit
82: Shift control ECU (Control component)
84: Solenoid drive circuit (Control component)
86: Neutral switch (Control component)
88: Resin casing (Container casing)
96: Rear side outer surface
100: Rear surface
104, 106: Brackets
Pend: Rear end position

What is claimed is:

1. An attachment structure for attaching a control component package unit to a transmission casing which accommodates a power transmitting mechanism of a vehicle and which is disposed in a drive-power-source compartment in a front section of the vehicle such that an axial direction of the power transmitting mechanism is parallel to a transverse direction of the vehicle, the control component package unit including a container casing accommodating control components for controlling the vehicle, the attachment structure being configured to attach the control component package unit to a rear side part of an outer surface of the transmission casing, such that a straight line normal to the rear side part extends in a direction having a component of a rearward direction of the vehicle, wherein the container casing of the control component package unit has a generally flat rear surface remote from the transmission casing, and is attached to the transmission casing such that an angle of a straight line normal to the generally flat rear surface of the container casing with respect to a longitudinal direction of the vehicle in a vertical plane falls within a range from +45° to −30°, where the angle of upward inclination with respect to the longitudinal direction in the vertical plane is positive.

2. The attachment structure according to claim 1, wherein at least a part of the container casing of the control component package unit, which has the generally flat rear surface, is formed of a resin material.

3. An attachment structure for attaching a control component package unit to a transmission casing which accommodates a power transmitting mechanism of a vehicle and which is disposed in a drive-power-source compartment in a front section of the vehicle such that an axial direction of the power transmitting mechanism is parallel to a transverse direction of the vehicle, the control component package unit including a container casing accommodating control components for controlling the vehicle, the attachment structure being configured to attach the control component package unit to a rear side part of an outer surface of the transmission casing, such that a straight line normal to the rear side part extends in a direction having a component of a rearward direction of the vehicle, wherein the control component package unit is attached to the transmission casing such that at least a portion of the control component package unit projects in the rearward direction of the vehicle from a rear end of a profile of the rear side part of the outer surface of the transmission casing, in the longitudinal direction of the vehicle in the vertical plane.

4. An attachment structure for attaching a control component package unit to a transmission casing which accommodates a power transmitting mechanism of a vehicle and which is disposed in a drive-power-source compartment in a front section of the vehicle such that an axial direction of the power transmitting mechanism is parallel to a transverse direction of the vehicle, the control component package unit including a container casing accommodating control components for controlling the vehicle, the attachment structure being configured to attach the control component package unit to a rear side part of an outer surface of the transmission casing, such that a straight line normal to the rear side part extends in a direction having a component of a rearward direction of the vehicle, wherein the control component package unit is attached to the transmission casing through a bracket device such that the container casing of the control component package unit is spaced apart from the rear side part of the outer surface of the transmission casing.

5. An attachment structure for attaching a control component package unit to a transmission casing which accommodates a power transmitting mechanism of a vehicle and which is disposed in a drive-power-source compartment in a front section of the vehicle such that an axial direction of the power transmitting mechanism is parallel to a transverse direction of the vehicle, the control component package unit including a container casing accommodating control components for controlling the vehicle, the attachment structure being configured to attach the control component package unit to a rear side part of an outer surface of the transmission casing, such that a straight line normal to the rear side part extends in a direction having a component of a rearward direction of the vehicle, wherein the transmission casing accommodates a belt-and-pulley type continuously variable transmission as the power transmitting mechanism, and at least a portion of the control component package unit is located within a dimension of the belt-and-pulley type continuously variable transmission in the transverse direction of the vehicle.

* * * * *